US008873066B2

(12) United States Patent
Ensher et al.

(10) Patent No.: US 8,873,066 B2
(45) Date of Patent: Oct. 28, 2014

(54) SYSTEM AND METHOD FOR IMPROVED RESOLUTION, HIGHER SCAN SPEEDS AND REDUCED PROCESSING TIME IN SCANS INVOLVING SWEPT-WAVELENGTH INTERFEROMETRY

(75) Inventors: Jason Ensher, Broomfield, CO (US); Michael Minneman, Broomfield, CO (US); Michael Crawford, Broomfield, CO (US)

(73) Assignee: Insight Photonic Solutions, Inc., Lafayette, CO (US)

( * ) Notice: Subject to any disclaimer, the term of this patent is extended or adjusted under 35 U.S.C. 154(b) by 0 days.

(21) Appl. No.: 13/182,780

(22) Filed: Jul. 14, 2011

(65) Prior Publication Data

US 2013/0016360 A1 Jan. 17, 2013

(51) Int. Cl.
*G01B 11/02* (2006.01)
*G01B 9/02* (2006.01)

(52) U.S. Cl.
CPC ........ *G01B 9/02004* (2013.01); *G01B 2290/45* (2013.01); *G01B 2290/70* (2013.01); *G01B 9/02091* (2013.01); *G01B 9/02005* (2013.01); *G01B 9/02069* (2013.01); *G01B 9/02007* (2013.01)
USPC .......................................................... 356/497

(58) Field of Classification Search
CPC .............. G01B 9/02005; H01S 5/0622; H01S 5/06255; H01S 5/06256; H01S 5/06258
USPC ............. 356/456, 477, 479, 497; 372/29.015, 372/38.07
See application file for complete search history.

(56) References Cited

U.S. PATENT DOCUMENTS

| 4,896,325 | A | * | 1/1990 | Coldren ........................... 372/20 |
| 6,418,249 | B1 | * | 7/2002 | Nakamura et al. .............. 385/24 |
| 6,788,719 | B2 | * | 9/2004 | Crowder ..................... 372/38.02 |
| 6,810,180 | B2 | * | 10/2004 | Yoneda ............................ 385/37 |
| 7,391,520 | B2 | * | 6/2008 | Zhou et al. ..................... 356/479 |
| 7,414,779 | B2 | * | 8/2008 | Huber et al. ................... 359/333 |
| 7,468,997 | B2 | | 12/2008 | Jayaraman |

(Continued)

OTHER PUBLICATIONS

Mao et al., "Simultaneous dual-wavelength-band common-path swept-source optical coherence tomography with single polygon mirror scanner", Optics Letters, vol. 36, No. 11, Jun. 1, 2011, pp. 1990-1992, Optical Society of America, Washington DC.

(Continued)

*Primary Examiner* — Michael A Lyons
*Assistant Examiner* — Shawn Decenzo
(74) *Attorney, Agent, or Firm* — Renner, Otto, Boisselle & Sklar, LLP.

(57) ABSTRACT

A system and method for measuring an interferometric signal from a swept-wavelength interferometer by scanning a tunable laser source over two wavelength ranges, whose centers are separated substantially more than the length of wavelength ranges. The spatial resolution of the measurement is determined by the inverse of the wavelength separation between a first and second wavelength region, as well as by the wavelength range of the first and second regions. An electronically tunable laser may be utilized to produce two wavelength ranges that are widely separated in wavelength. Such a system and method has wide applications to the fields of optical frequency domain reflectometry (OFDR) and swept-wavelength optical coherence tomography (OCT), for example.

26 Claims, 8 Drawing Sheets

(56) References Cited

U.S. PATENT DOCUMENTS

| | | | |
|---|---|---|---|
| 7,732,784 B2 * | 6/2010 | Shimizu et al. | 250/393 |
| 7,733,497 B2 * | 6/2010 | Yun et al. | 356/497 |
| 7,903,257 B2 * | 3/2011 | de Boer et al. | 356/497 |
| 8,531,677 B2 * | 9/2013 | Dunn et al. | 356/511 |
| 2007/0013917 A1 * | 1/2007 | Stubbe et al. | 356/511 |
| 2008/0117427 A1 | 5/2008 | Teramura et al. | |
| 2011/0029049 A1 * | 2/2011 | Vertikov et al. | 607/104 |
| 2011/0080591 A1 * | 4/2011 | Johnson et al. | 356/479 |

OTHER PUBLICATIONS

V. Jayaraman, Z.M. Chuang, and L.A Coldren, "Theory, Design and Performance of Extended Tuning Range Semiconductor Lasers with Sampled Gratings," IEEE Journal of Quantum Electronics, vol. 29, No. 6, pp. 1824-1834, Jun. 1993.

V. Jayaraman, M.E. Heimbuch, L.A. Coldren, and S.P. Denbaars, Widely Tunable Continuous-Wave InGaAsP/InP Sampled Grating Lasers, Electronics Letters, vol. 30, No. 13, pp. 1492-1493, Sep. 1, 1994.

\* cited by examiner

SYSTEM AND METHOD FOR IMPROVED RESOLUTION, HIGHER SCAN SPEEDS AND REDUCED PROCESSING TIME IN SCANS INVOLVING SWEPT-WAVELENGTH INTERFEROMETRY

TECHNICAL FIELD

The present invention relates generally to an apparatus and a method to improve spatial resolution and reduce measurement time for optical coherence tomography (OCT) and optical frequency domain reflectometry (OFDR) systems.

BACKGROUND

In typical OCT and OFDR systems, the spatial resolution of the measurement is determined by the range of a continuous sweep of a tunable laser source. Therefore, the measurement time of an OCT or OFDR system is limited by how quickly the laser can scan the wide wavelength ranges—for example, 100 nm at a rate of 100 kHz. The spatial resolution of the measurement is also limited by the technical limit of how wide a wavelength range that a single laser can scan. The current state-of-the-art tunable lasers operating at 1310 nm or 1550 nm can scan, at most, a 100-150 nanometer (nm) range.

SUMMARY

The fields of OCT and OFDR would benefit from the present invention, which enables the same or increased spatial resolution as existing laser sources, but at much faster scan rates and with less signal processing burden; and enables higher spatial resolution than existing laser sources by allowing for larger effective scan ranges. In order to overcome the above problems, aspects of the present invention relate to measuring interferometer signals over a first and a second wavelength (or optical frequency) range that are widely separated, thereby improving the spatial resolution of the interferometer measurement by using the wide wavelength separation between measurement regions.

One aspect of the present invention relates to a swept electromagnetic radiation system, including: at least one electromagnetic radiation source operable to generate electromagnetic radiation through a first range of wavelengths and a second range of wavelengths, wherein the first range of wavelengths and the second range of wavelengths are spectrally separated; an interferometer coupled to the at least one electromagnetic radiation source, wherein the interferometer includes a reference path and a sample path; a detector for receiving electromagnetic radiation returned from the reference path and the sample path, wherein the detector generates output signals corresponding to the received electromagnetic radiation; and a controller coupled to the detector and the at least one electromagnetic radiation source, wherein the controller selectively causes electromagnetic radiation to be generated through the first range and the second range, wherein a predetermined period of time elapses between a transition between the first range and the second range; and the controller processes the output signals to generate image signals.

Another aspect of the invention relates to a method for sweeping electromagnetic radiation over a first range of wavelengths and a second range of wavelengths to generate an image, the method including: generating electromagnetic radiation through a first range of wavelengths and a second range of wavelengths by an electromagnetic radiation source, wherein the first range of wavelengths and the second range of wavelengths are spectrally separated and the electromagnetic radiation is output through either the first range or the second range at a given time; splitting the electromagnetic radiation through a reference path and a sample path; detecting electromagnetic radiation returned from the reference path and the sample path, wherein the detector generates output signals corresponding to the received electromagnetic radiation; and processing the output signals to generate an image.

Another aspect of the invention relates to a swept electromagnetic radiation system, including: at least one electromagnetic radiation source operable to generate electromagnetic radiation through two or more ranges of wavelengths, wherein the two or more ranges of wavelengths are spectrally separated; an interferometer coupled to the at least one electromagnetic radiation source, wherein the interferometer includes a reference path and a sample path; a wavelength-dependent splitter for dividing the light from the interferometer into two or more paths corresponding to the two or more wavelength ranges; one or more detectors coupled to the wavelength-dependent splitter, wherein at least one detector is operable to detect at least one spectrally separated range of wavelengths output from the wavelength-dependent splitter and each of the one or more detectors is operable to generate output signals corresponding to the received electromagnetic radiation; and a controller coupled to the one or more detectors and the at least one electromagnetic radiation source, wherein the controller selectively causes electromagnetic radiation to be generated through the two or more wavelength ranges during overlapping predetermined time periods; and the controller processes the output signals to generate image signals.

Another aspect of the invention relates to a swept electromagnetic radiation system, including: at least one electromagnetic radiation source operable to generate electromagnetic radiation through two ranges of wavelengths, wherein the two ranges of wavelengths are spectrally separated and the state of polarization of light in the first wavelength range is orthogonal to light in the second wavelength range; an interferometer coupled to the at least one electromagnetic radiation source, wherein the interferometer includes a reference path and a sample path; a polarization-dependent splitter for dividing the light from the interferometer into two paths corresponding to the two or more wavelength ranges; one or more detectors coupled to the polarization-dependent splitter, wherein at least one detector is operable to detect at least one spectrally and polarization separated range of wavelengths output from the polarization-dependent splitter and each of the one or more detectors is operable to generate output signals corresponding to the received electromagnetic radiation; and a controller coupled to the one or more detectors and the at least one electromagnetic radiation source, wherein the controller selectively causes electromagnetic radiation to be generated through the two or more wavelength ranges during overlapping predetermined time periods; and the controller processes the output signals to generate image signals.

A number of features are described herein with respect to embodiments of the invention; it will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

DESCRIPTION

Aspects of the invention are directed to measuring an interferometric signal from a swept-wavelength interferometer by scanning at least one tunable laser source over two wavelength ranges that are widely separated in wavelength, wherein the separation between the ranges is substantially larger (e.g., ten times larger) than the length of the two wavelength ranges. The spatial resolution of the measurement is determined by the inverse of the wavelength separation between the first and second wavelength region, as well as by the wavelength range of the first and second regions.

Figure 1:
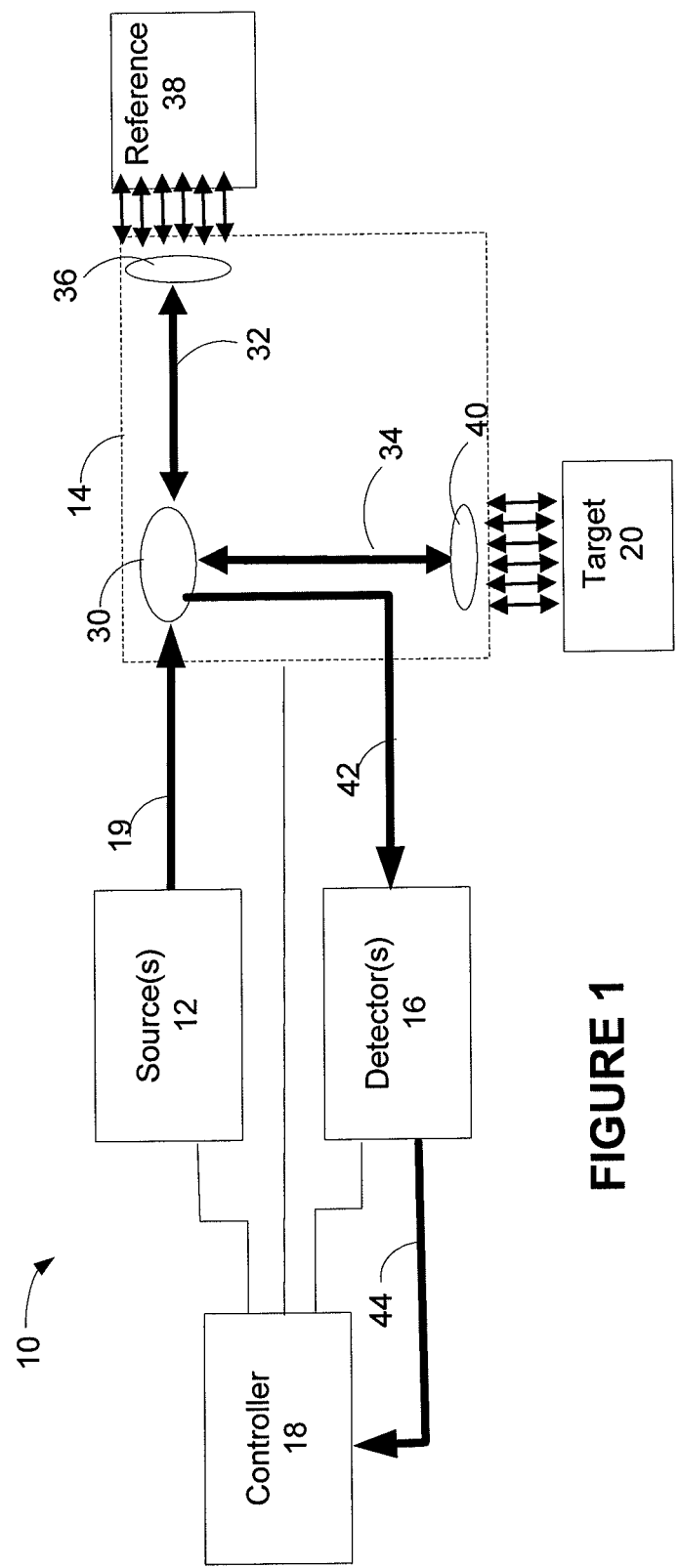
FIGS. 1-2 are schematic illustrations of exemplary systems in accordance with aspects of the present invention.

An exemplary swept electromagnetic radiation system 10 in accordance with aspects of the present invention is illustrated in FIG. 1. Referring to FIG. 1, the system 10 includes at least one electromagnetic radiation source 12, an interferometer 14 (identified by dashed lines); a detector 16 and a controller 18. Electromagnetic radiation 19 is directed from the at least one radiation source 12 to a target 20 to detect a physical characteristic associated with the target, as discussed herein.

The at least one electromagnetic radiation source 12 is operable to generate electromagnetic radiation through a first range of wavelengths and a second range of wavelengths. The first range of wavelengths and the second range of wavelengths are spectrally separated.

In one embodiment of the present invention, at least one electromagnetic radiation source 12 is an electronically tunable laser. The electronically tunable laser may be a semiconductor laser that is electronically tunable to discretely move between the first range to the second range without continuously sweeping a region between the first range and the second range. For example, the electronically tunable laser may be a sampled grating distributed Bragg reflector (SG-DBR) laser. The output wavelength of the SG-DBR laser may be electronically-tuned by adjusting one or more input currents to the device. In one exemplary illustration, the device may be tuned by changing up to 5 different input currents to the device. By electronic tuning the output wavelength of the emitted electromagnetic radiation, the source 12 can be programmed and/or controlled by the controller 18 to scan the currents such that the wavelength scans over a first wavelength range, then switches immediately to one or more different currents that scan the device 12 over a second wavelength range, for example. Other embodiments of the invention may comprise used of tunable lasers such as Vertical-Cavity Surface-Emitting Lasers (VCSELs) or multi-section lasers such as Super-Structure Grating DBR lasers (SSG-DBRs), Digital Supermode DBR lasers (DS-DBRs) or Y-Branch lasers.

In one embodiment, a predetermined period of time elapses during the transition of the source between the first range and second range of electromagnetic radiation. The predetermined period of time may be any desired time. One design criterion is to minimize the period of time to shorten the sweep duration and have the period of time large enough to prevent interference between the two wavelength ranges. In another embodiment, discussed below, the sources output electromagnetic radiation in at least partially overlapping periods of time.

As discussed above, the electromagnetic radiation source 12 is operable to generate swept-wavelength electromagnetic radiation in the first range and the second range and the source may be electronically tunable to discretely move between the first range and the second range without continuously sweeping a region between the first range and the second range.

Figure 2:
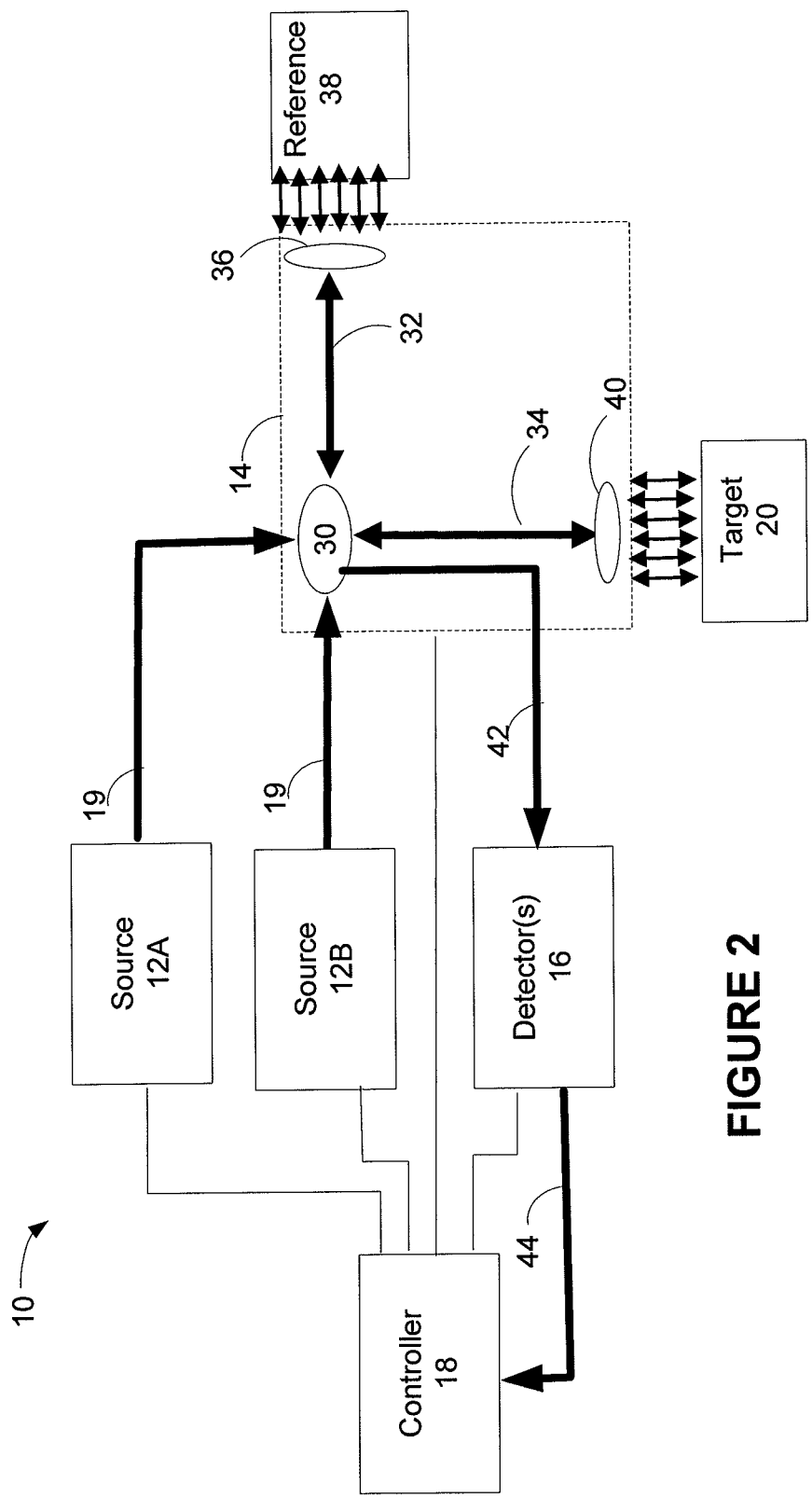

In another embodiment, illustrated in FIG. 2, the radiation source 12 includes two discrete sources (12A, 12B) of electromagnetic radiation. Each source 12A, 12B is operable to generate electromagnetic radiation through a range of wavelengths, wherein the range of wavelengths of the two sources is spectrally separated. For example, at least one electromagnetic radiation source generates electromagnetic radiation in the first range and the second electromagnetic radiation source is operable to generate electromagnetic radiation in the second range. In one embodiment, it is desirable that the first range of wavelengths and second range of wavelengths is separated by at least 80-200 nanometers.

In another embodiment, the relative wavelength error between the first and second center point wavelengths of the ranges is less than a small fraction of the center wavelength, such $1 \times 10^{-5}$. For example, if the first center wavelength is 1500 nm and the second center wavelength is 1600 nm, then a 0.01 relative wavelength error between the wavelength centers leads to a $7 \times 10^{-6}$ fractional wavelength error. In another embodiment, the relative wavelength error between the first and second center point wavelengths is less than a small fraction of the center wavelength, such $1 \times 10^{-6}$. Determining the relative wavelengths between the first and second ranges to high accuracy enables processing the measurements with the light, such as by performing a Fourier Transform across the data set for both the first and second wavelength ranges.

The sources 12A, 12B may be any source of electromagnetic radiation. The sources may be the same or different sources of electromagnetic radiation. For example, one source may be a semiconductor laser and another source may be another source (such as an external cavity diode laser or tunable solid-state laser). Any combination of sources of electromagnetic radiation is deemed to fall within the scope of the present invention.

Generally, a predetermined period of time elapses between transition between the first source of electromagnetic radiation 12A and the second source of electromagnetic radiation 12B and vice versa. The predetermined period of time may be any desired time.

The wavelength separation between the first and second wavelength ranges may be substantially larger than the ranges. For instance, the wavelength ranges could be 1 nanometer wide, but be separated by 100 nanometers. The time to switch currents such that the laser stops emitting in the first wavelength range and starts emitting in the second range may be substantially shorter than the time to scan continuously from the first to the second wavelength region. For example, at a scan rate of 100 kHz, a continuous 100 nanometer scan requires 10 microseconds. In the alternate case, of a first and second wavelength region of 1 nanometer width, the current switching time, from the first to second wavelength region could be as short as 5-10 nanoseconds. Hence the total scan time of the first and second wavelength regions dominates the measurement time, requiring only 200 nanoseconds with negligible contribution from the transition between regions.

Generally, any tunable laser source could be used to scan two separated wavelength regions and quickly scanning from the first to the second to save time. Such a tuning approach could be applied by a mechanically tuned external cavity diode laser, for example. As a practical matter, for a mechanically-tunable laser source to scan two separated wavelength regions may be problematic because of the difficulty in stabilizing such a laser during transitions from one region to another at a fast transition speed, for example.

In one embodiment, the source 12 may be a SG-DBR laser device. An SG-DBR laser device may enable an improvement in the spatial resolution of an OCT or OFDR measurement by enabling an effectively wider wavelength range. For example, a 1310 nm SG-DBR device and a 1550 nm SG-DBR device could be combined onto a single chip. The combined devices could be electronically tuned from a wavelength region near 1310 nanometer, to another region at 1550 nanometer. The two wavelength regions near 1310 and 1550 nanometers may have a fairly narrow range, on the order of 1-5 nanometers. By knowledge of the relative scan wavelengths (obtained through a measurement interferometer, a gas reference cell, a stable wavelength reference such as a temperature-stabilized Fiber Bragg Grating or Fabry-Perot etalon, for example), a relationship can be determined between the wavelengths of the two discontinuous scan regions and achieve resolution inversely proportional to the wavelength separation between 1310 and 1550 nm (240 nm), which is much wider than the 1-5 nanometer range of either the first or second wavelength region.

In one embodiment, the relative wavelength error between the first and second center point wavelengths is less than a small fraction of the center wavelength, such $1 \times 10^{-6}$. In another embodiment, the relative wavelength error between the first and second center point wavelengths is less than a small fraction of the center wavelength, such $1 \times 10^{-6}$.

One of ordinary skill in the art will readily appreciate that the frequencies, wavelengths, and ranges discussed above are exemplary in nature and not intended to limit the scope of the present invention.

The interferometer, identified generally by the dashed lines 14, may be coupled to the one or more electromagnetic radiation sources 12 by a coupler 30. Any type of interferometer may be used in accordance with aspects of the present invention. Exemplary interferometers include, for example: a Mach-Zehnder interferometer, a Michelson interferometer, a Fabry-Perot interferometer, etc. The interferometer 14 may include fewer components or more components than identified within the confines of the dashed line. The illustrated interferometer 14 is exemplary and provided to assist one skilled in the art in understanding aspects of the present invention.

Generally, the coupler 30 splits the received electromagnetic radiation into a reference path 32 and a target path 34. For the reference path 32, the electromagnetic radiation is output through a lens unit 36 and reflected off a reference 38. In one embodiment, the reference 38 may be a mirror or any known reference reflector with partial reflectivity. For the target path, the electromagnetic radiation is output through a lens unit 40 and reflected off a target 20. The target 20 may be any desirable target. Exemplary targets include, for example, human tissue, inanimate objects, etc.

Radiation returning from the reference path 32 and the target path 34 travels through the respective lens unit (e.g., 36, 40) and is combined with the coupler 30 or another beam combining component to form signal 42, as is known in the interferometry art. The coupler 30 may be any type of device that may be used to split or route electromagnetic radiation received (e.g., signal 19) into two or more radiation paths (e.g., paths 32, 34) and/or join two or more received radiation paths into a single signal (e.g., signal 42). For example, the coupler may be a splitter for separating and/or combining optical mediums (e.g., a fiber optic cable, etc.), a beam splitter and the like. As shown in FIG. 1, the coupler 30 may be a 3 dB coupler that splits the incoming light into two separate radiation paths (e.g., reference path 32 and target path 34) of approximately equal intensity of light. The two radiation paths 32 and 34 may be recombined after the electromagnetic radiation has traversed separate radiation paths 32, 34 at the coupler 30 and/or a different coupler (not shown).

After the electromagnetic radiation has traversed one of the reference path 32 or the target path 34, the coupler 30 may combine the received electromagnetic radiation into a single output signal 42. In this case, the output signal is a fringe pattern of amplitude vs. time or spatial dimension that may be detected by a detector 16 (e.g., a photodetector, a phase detector, frequency detector, linear detector array or other suitable detector). The coupler 30 functions to combine the electromagnetic radiation that has traversed radiation paths 32, 34. One of ordinary skill in the art will readily appreciate that the output signal and the detector may vary based on the electromagnetic radiation, wavelength, frequency and/or range used in conjunction with the system.

The detector 16 receives electromagnetic radiation 42 returned from the reference path 32 and the target (also referred herein as sample) path 34. The combined, interfered electromagnetic radiation (e.g., signal 42) is received by the detector 16. The detector 16 may be a single channel and/or a multi-channel detector. The detector 16 generates one or more output signals 44 that are based on the received electromagnetic radiation from the reference path 32 or target path 34.

The output signals 44 are received by controller 18. The controller 18 is coupled to the interferometer 14, the detector 16 and the at least one electromagnetic radiation source 12. The controller 18 selectively causes the source 12 to generate electromagnetic radiation through the first range and the second range. As noted above, a predetermined period of time elapses between a transition between the first range and the second range.

The controller 18 processes the output signals to represent data corresponding to amplitude and distance information detected by the detector 16. For example, a graph of reflection amplitude vs. distance may be created for each scan. A single scan of the electromagnetic radiation source produces a one-dimensional graph. The output signals of multiple scans may be combined to generate one or more image signals. For example, multiple scans of one-dimensional graphs are used to assemble a two-dimensional representation of data that relates to the target, as is conventional.

In one embodiment, the first range of wavelengths and the second range of wavelengths are separated by at least 80-200 nanometers. The first range has a first center point wavelength and the second range has a second center point wavelength, wherein the second center point wavelength is greater than the first center point wavelength. The first range may be the same or different from the second range. In one embodiment, the first range of wavelengths and the second range of wavelengths are non-overlapping. In another embodiment, the first range of wavelengths and the second range of wavelengths may at least partially overlap. In another embodiment, the relative wavelength error between the first and second center point wavelengths is less than a small fraction of the center wavelength, such $1 \times 10^{-6}$. In another embodiment, the relative wavelength error between the first and second center point wavelengths is less than a small fraction of the center wavelength, such $1 \times 10^{-6}$.

Figure 3:
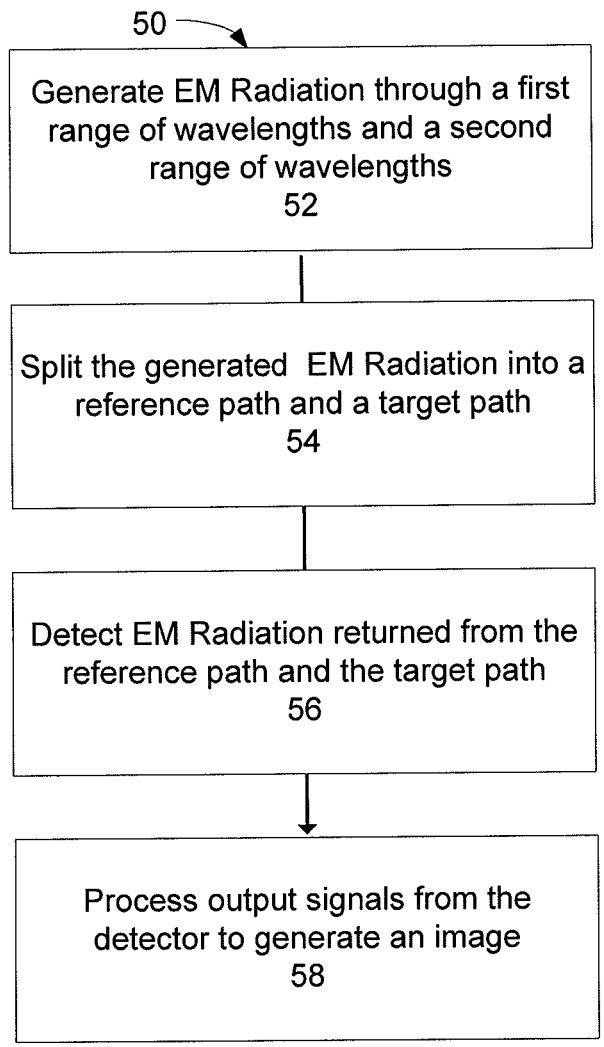
FIG. 3 is an exemplary method in accordance with aspects of the present invention.

Another aspect of the invention relates to an exemplary method 50, illustrated in FIG. 3, for sweeping electromagnetic radiation over a first range of wavelengths and a second range of wavelengths to generate an image. As illustrated in FIG. 3, the method 50 includes, at block 52, generating electromagnetic radiation through a first range of wavelengths and a second range of wavelengths by an electromagnetic radiation source, wherein the first range of wavelengths and the second range of wavelengths are spectrally separated and the electromagnetic radiation is output through either the first range or the second range at a given time. As discussed above, the source electromagnetic radiation may be a single source and/or two distinct electromagnetic radiation sources, wherein a first source of electromagnetic radiation generates electromagnetic radiation in the first range and a second source of electromagnetic radiation generates electromagnetic radiation in the second range, for example.

In one embodiment, the electromagnetic radiation source is electronically tuned to discretely move between the first range and the second range without continuously sweeping a region between the first range and the second range.

In order to avoid interference between electromagnetic radiation in the first range and the second range, a predetermined time may elapse prior to electronically tuning the electromagnetic radiation source to discretely move between the first and the second range. The predetermined time may be any desired time to prevent interference from being detected between the first range and the second range.

At block 54, the electromagnetic radiation is split through a reference path 32 and a target path 34. The electromagnetic radiation may be split by any desired mechanism. In one embodiment, an interferometer is utilized to split the source of electromagnetic radiation into the reference path and the target path. Any type of interferometer may be used in accordance with aspects of the present invention. Exemplary interferometers include, for example: a Mach-Zehnder interferometer, a Michelson interferometer, a Fabry-Perot interferometer, etc.

At block 56, electromagnetic radiation returned from the reference path and the sample path is detected by a detector 16. As stated above, the detector 16 generates output signals corresponding to the received electromagnetic radiation.

At block 58, the output signals are processed to generate an image for presentation on a display and/or are stored electronically on a storage medium (e.g., a disk drive, portable storage medium, etc). Generally each scan produces a one-dimensional graph. Multiple scans may be combined to generate a two-dimension image, as is conventional.

One of ordinary skill in the art will appreciate that while block 52 indicates generating electromagnetic radiation through a first range of wavelengths and a second range of wavelengths by an electromagnetic radiation source, the steps of detection, and processing the output signals generally occur after each range of wavelengths is generated and reflected signal is detected by the detector.

Figure 4:
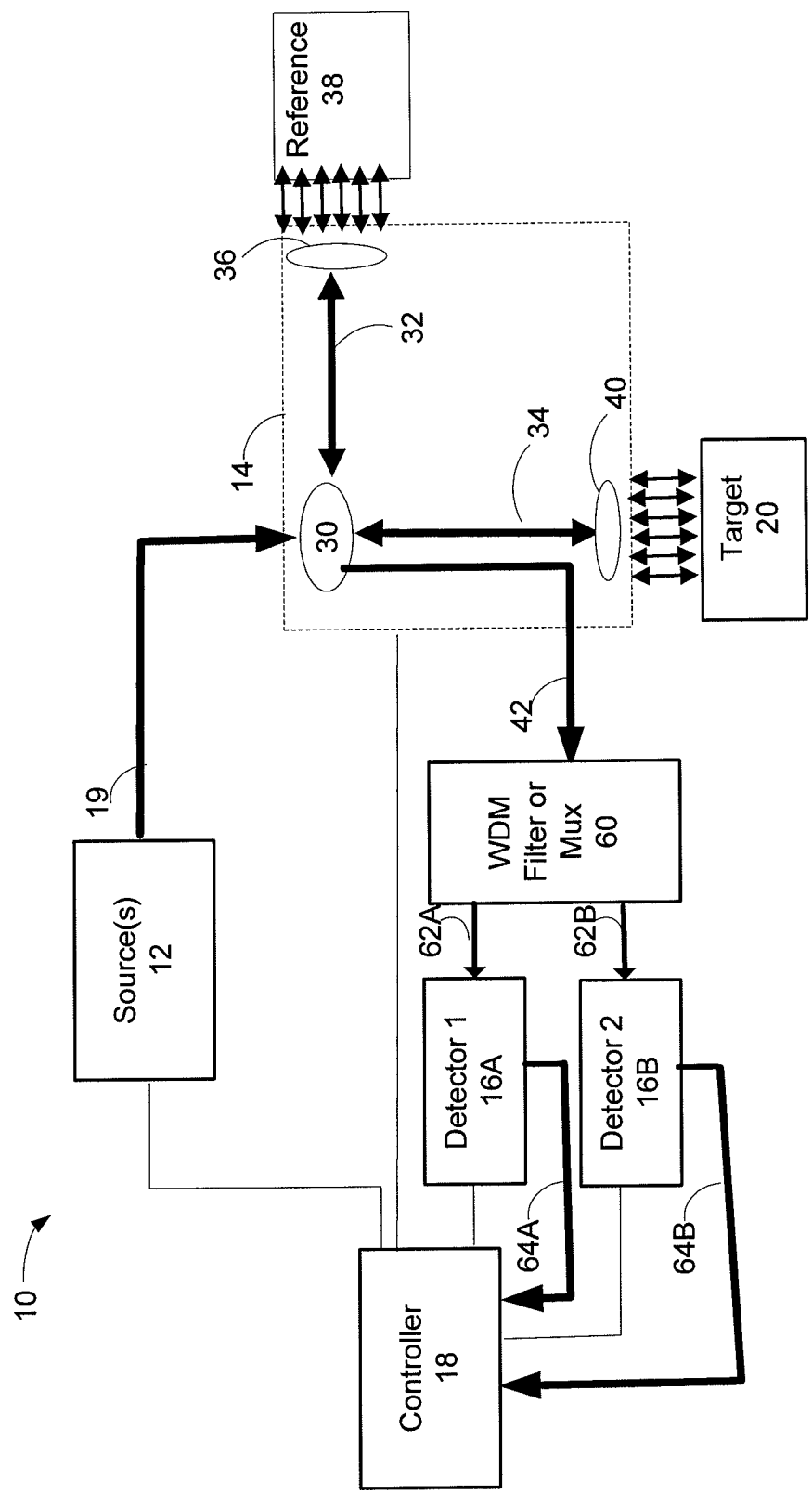
FIGS. 4-6 are schematic illustrations of exemplary systems in accordance with aspects of the present invention.

Another embodiment of the invention is illustrated in FIG. 4. In FIG. 4, the components of the system perform identical functions as described above with respect to FIGS. 1 and 2, except that electromagnetic radiation may be swept simultaneously in the first wavelength region and the second wavelength region, from one or more electromagnetic radiation sources (e.g., source(s) 12). Electromagnetic radiation output from the interferometer 14 is received by a wavelength-dependent splitter 60 such as a fiber-optic wavelength division demultiplexer (WDM) or Array Waveguide Grating (AWG). Many other technologies may serve as a wavelength-dependent splitter such as a prism, an optical grating, a Fiber-Bragg grating, or a number of optical filter-based devices. The wavelength-dependent splitter 60 separates the light into a first output path 62A corresponding to the first wavelength region and a second output path 62B corresponding to the second wavelength region. Electromagnetic radiation from the first output path 62A is detected by a first detector (e.g., detector 16A) and light from the second output path 62B is detected by a second detector (e.g., detector 16B). By knowledge of the wavelength of the electromagnetic radiation in both the first and second ranges, the data (e.g., signals 64A and 64B) from the two detectors (e.g., detectors 16A, 16B) may be combined by the controller 18 into a single spectrum of fringes versus wavelength, which may be processed to produce an image signal or process in any other desired manner. The advantage of sweeping light in the first and second wavelength ranges in overlapping or concurrent time periods is that the time to complete the sweep may be reduced by approximately a factor of two over the time to sweep the first and second wavelength ranges in a sequential manner.

Figure 5:
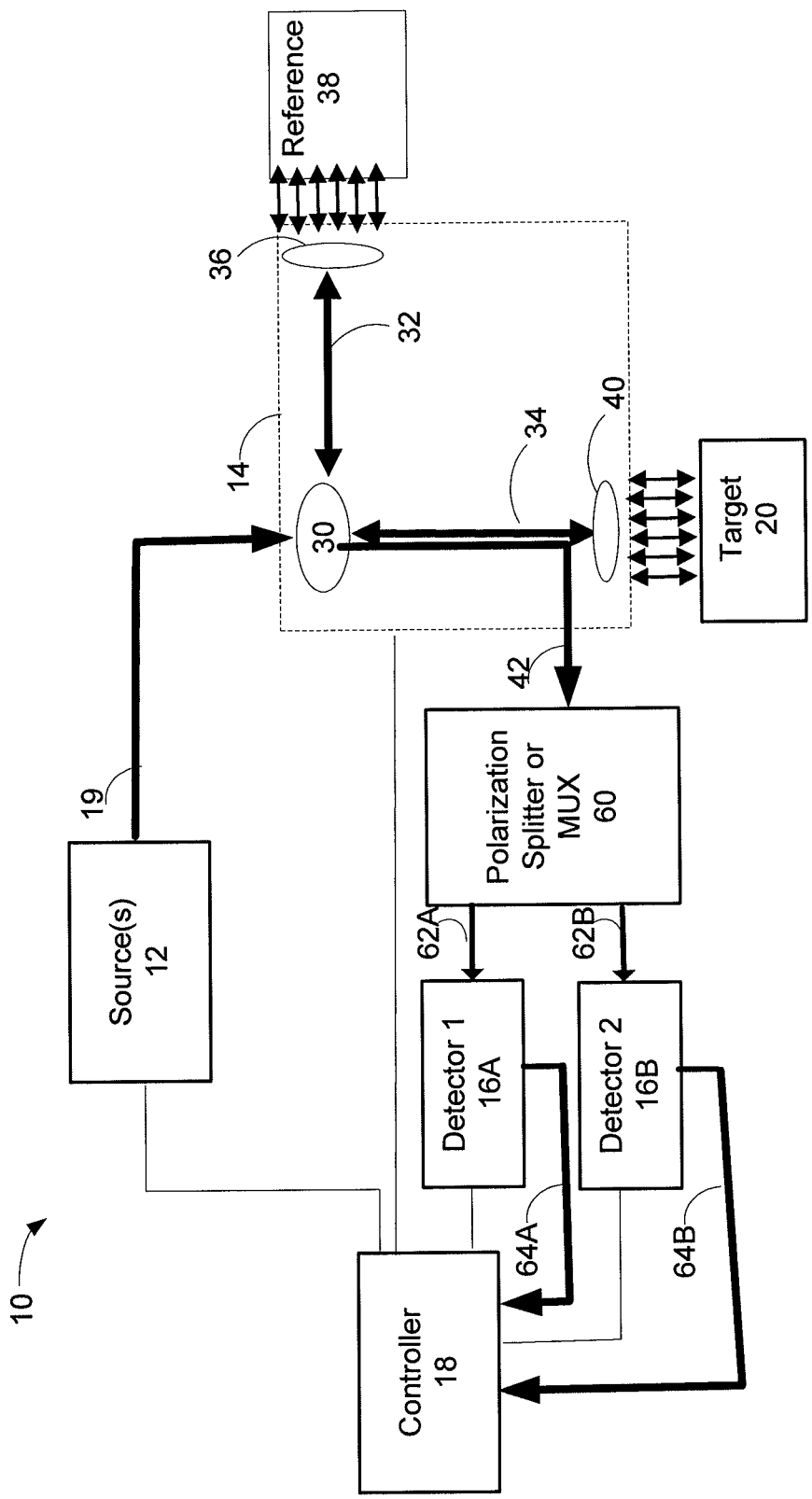

Another embodiment of the invention is illustrated in FIG. 5. In FIG. 5, the components of the system perform identical functions as described above with respect to FIG. 4, except that electromagnetic radiation may be swept simultaneously in the first wavelength region and the second wavelength region, from one or more electromagnetic radiation sources (e.g., source(s) 12). Furthermore, electromagnetic radiation in the first wavelength region has a state of polarization that is orthogonal to the state of polarization of light in the second wavelength region. For example, light in wavelength region one may be linearly polarized orthogonal to linearly polarized light in wavelength region two. Electromagnetic radiation output from the interferometer 14 is received by a polarization-dependent splitter or demultiplexer 60 such as a fiber-optic polarization beamsplitter (PBS). Many other technologies may serve as a polarization-dependent splitter such as optical glass PBS cubes or Glan-Thompson prisms, for example. The polarization-dependent splitter 60 separates the light into a first output path 62A corresponding to the first wavelength region and a second output path 62B corresponding to the second wavelength region. Electromagnetic radiation from the first output path 62A is detected by a first detector (e.g., detector 16A) and light from the second output path 62B is detected by a second detector (e.g., detector 16B). By knowledge of the wavelength of the electromagnetic radiation in both the first and second ranges, the data (e.g., signals 64A and 64B) from the two detectors (e.g., detectors 16A, 16B) may be combined by the controller 18 into a single spectrum of fringes versus wavelength, which may be processed to produce an image signal or process in any other desired manner. The advantage of sweeping light in the first and second wavelength ranges in overlapping or concurrent time periods is that the time to complete the sweep may be reduced by approximately a factor of two over the time to sweep the first and second wavelength ranges in a sequential manner. A further advantage of using light in the first wavelength region that is in an orthogonal state of polarization to light in the second wavelength region is that interference between light in region one and region two may be suppressed.

Another aspect of the invention relates to a wavelength measurement system for determining the wavelength over the first and second wavelength regions. The wavelength measurement system may comprise a reference interferometer (e.g., interferometer 14) and an absolute wavelength reference, such as a Mach-Zehnder reference interferometer and an absolute gas reference cell (in place of reference 32), for example. Alternatively, the wavelength measurement system may comprise a fast wavelength measurement instrument.

It should be noted that aspects of the present invention may also be generalized to cover more than two wavelength scanning regions, such as three or four or more wavelength scanning regions. The combination of more than two wavelength scan regions may be selected by someone skilled in the art to improve spatial resolution or sample response (such as in human tissue, animal tissue, or transmission in inanimate or other animate objects). As such, spatial resolution of OCT and/or OFDR systems may be improved with reduced measurement scan time by scanning one or more electromagnetic radiation sources over two or more wavelength (or optical frequency) regions that are separated in wavelength (or frequency).

Figure 6:
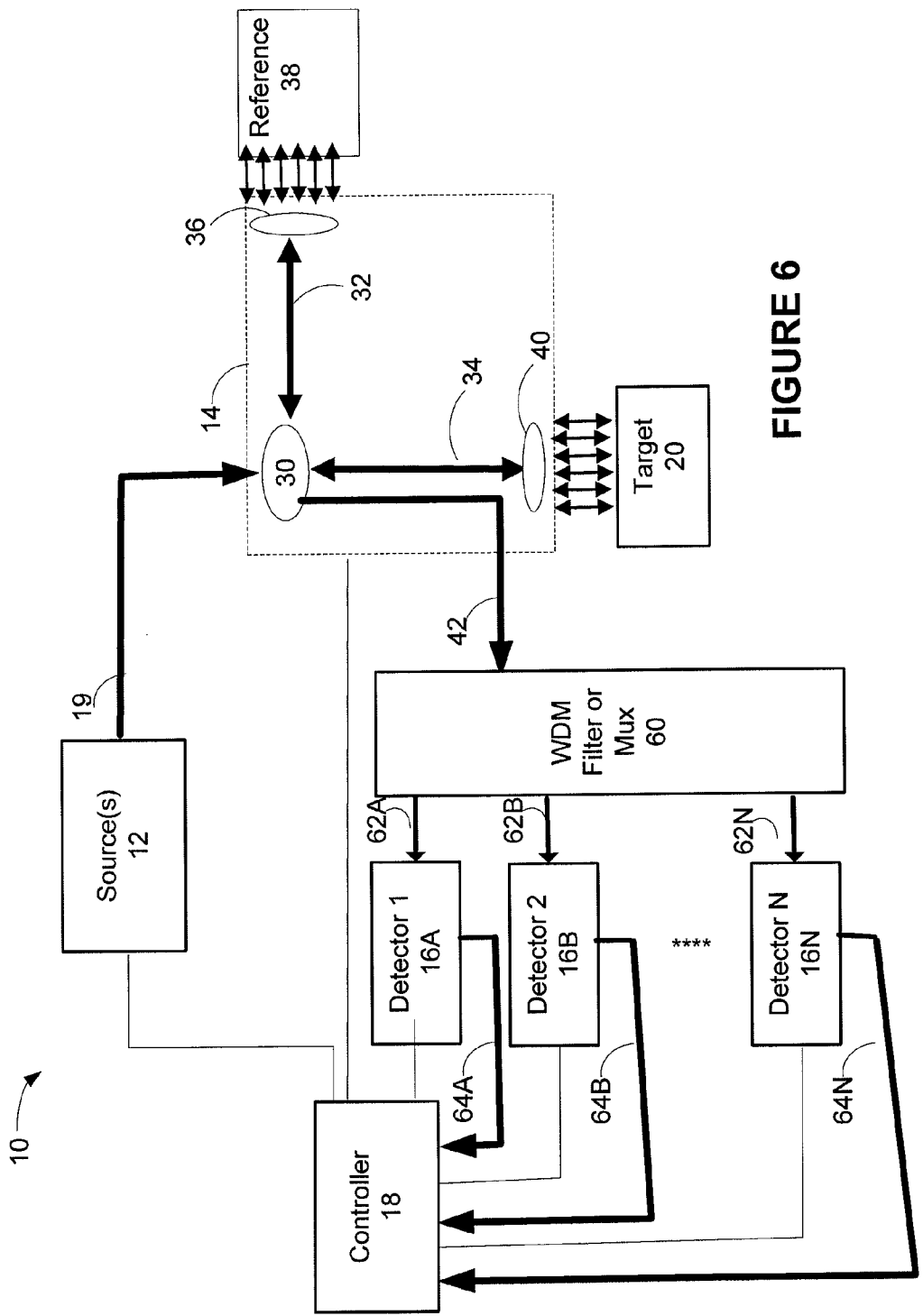

A generalization to two or more wavelength scanning regions may be realized in another embodiment of the invention, wherein the two or more wavelength regions are detected during overlapping or concurrent time periods. The wavelength scanning regions may be created by separate scanning sources of electromagnetic radiation, or by a single source that scans concurrently in two or more wavelength regions. Such an embodiment is illustrated in FIG. 6. In an embodiment of the invention, electromagnetic radiation from interferometer 14 couples to a wavelength-dependent splitter 60 such as wavelength-division demultiplexing filter or an arrayed waveguide grating (AWG) demultiplexer. Many other technologies may serve as a wavelength-dependent splitter, such as a prism, an optical grating, a Fiber-Bragg grating, a number of optical filter-based devices, for example. The electromagnetic radiation input to the wavelength-dependent splitter 60 is divided into two or more different paths (62A, 62B . . . , and 62N) depending on the wavelength. A first output (62A) from the splitter filters out a spectral region from the input that corresponds to a first wavelength region; a second output (62B) from the splitter corresponds to a second wavelength region of the input optical spectrum; and so on, such that an Nth output (62N) corresponds to an Nth wavelength region of the input optical spectrum. Each of the two or more outputs (e.g., signals 62A, 62B, . . . , and 62N) from the wavelength-dependent splitter 60 may be coupled to a detector (e.g., 16A, 16B, . . . , and 16N), creating two or more detected signals (64A, 64B, . . . , and 64N) that couple to the controller 18 for further processing. For example, the controller 18 may process the signals for the different wavelength scanning regions to produce a signal. By scanning the two or more regions during overlapping or concurrent times, the time to scan two or more regions is reduced. For example, scanning N regions in this manner is N times faster than scanning each region sequentially in time. The spatial resolution of an image produced from the two or more wavelength regions may correspond to the wavelength separation between the two regions with the largest wavelength separation. The additional wavelength scanning regions may provide signals in regions that respond to the light, such as through a specific spectroscopic response (for example, absorption or scattering) of the tissue or material under testing. Other responses of interest may be polarization sensitivity to absorption or scattering. The listed spectroscopic or polarization responses indicate a specific quality of the material under test. Different wavelength regions may indicate a different quality of the material. Hence, the image generated from two or more wavelength regions provides spatial and qualitative information about the tissue or material tested.

Figure 7:
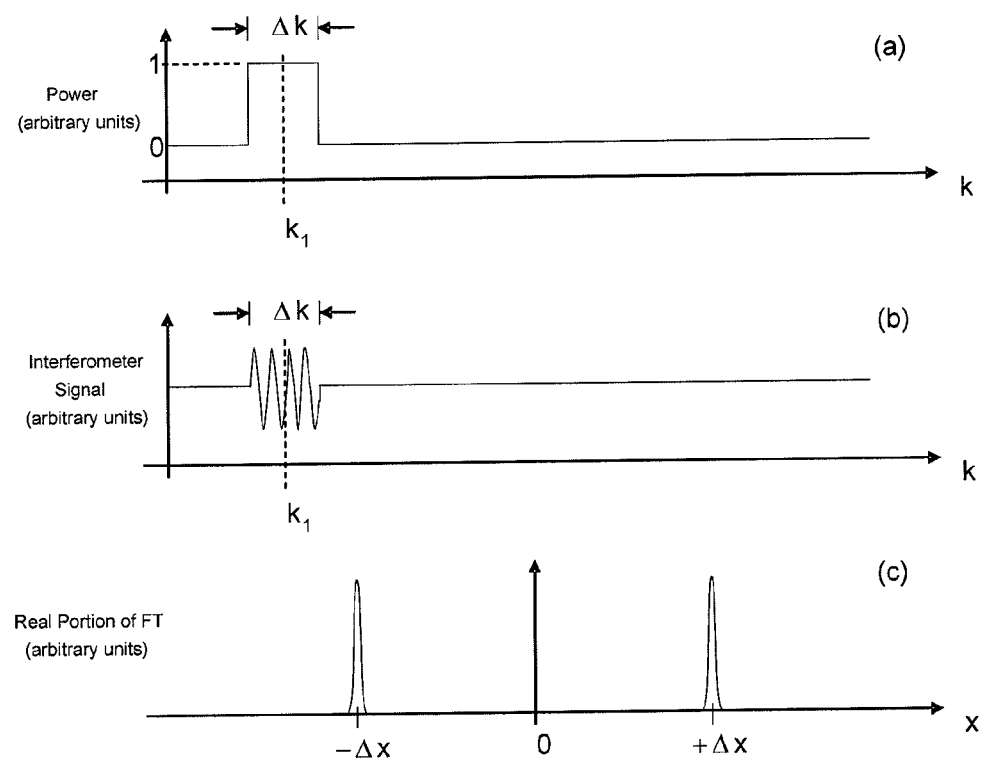
FIGS. 7(a)-7(c) are graphical illustrations of power versus k, interferometer signal and Fourier Transform versus the wavenumber k for a single wavelength scan region in accordance with aspects of the present invention.

The following illustrates that the spatial resolution is inversely proportional to the wavelength separation between the two wavelength scanning regions. For example, consider a single wavelength scan in an interferometer with a path length mismatch of $\Delta x$, over a range $k_1-\Delta k/2$ to $k_1+\Delta k/2$, where k is the k-vector of the light defined as $2\pi/\lambda$, as shown in FIGS. 7(a)-7(c). If the scan has a rectangular (constant) power profile within the scan range (FIG. 7(a)), then the interferometer output signal will look like the graph in FIG. 7(b) as a function of k. The Fourier transform of the interferometer signal includes three components, a DC component at x=0 and two components due to the interference, at x=$\pm\Delta x$ (FIG. 7(c)). The spatial resolution of the scan is determined by the width of the real portion of the component signal at either x=$\pm\Delta x$. The signal at x=$\Delta x$ is given by the unnormalized Sinc Function (e.g., Sinc($\Delta k(\Delta x-x)$)), with a half-width at zero equal to $\pi/\Delta k$.

Figure 8:
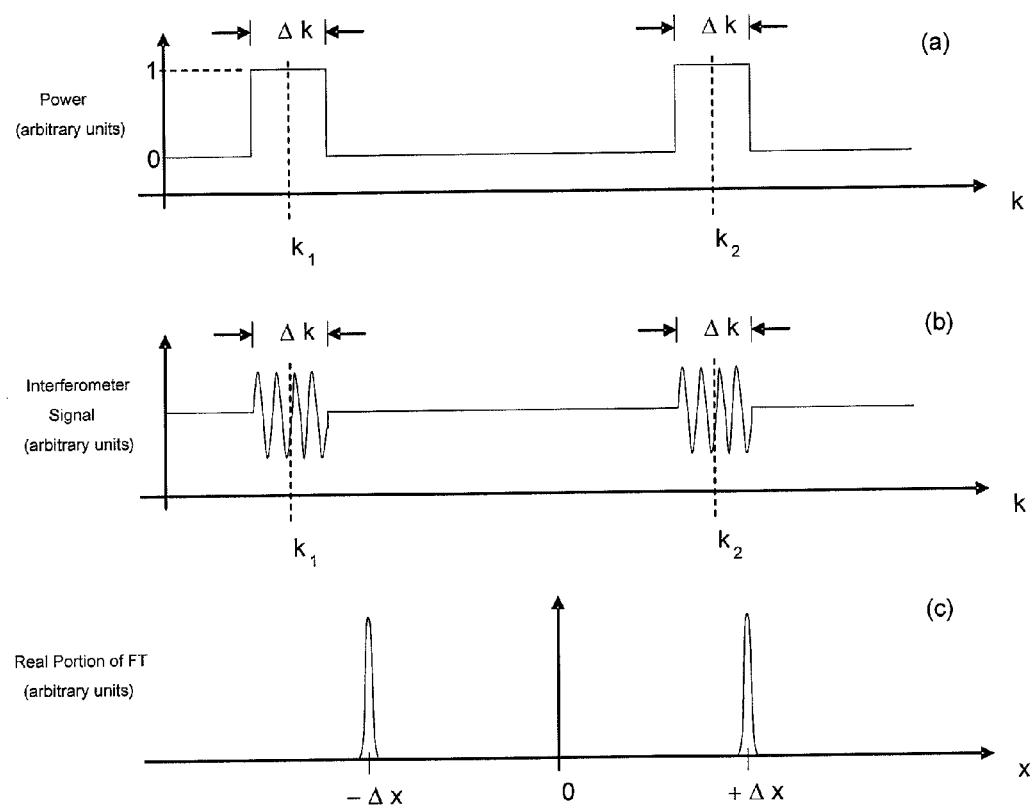
FIGS. 8(a)-8(c) are graphical illustrations of power versus k, interferometer signal and Fourier Transform versus the wavenumber k for a laser scan of two separated wavelength scan regions in accordance with aspects of the present invention.

FIG. 8A illustrates a laser scan having a first wavelength region $k_1-\Delta k/2$ to $k_1+\Delta k/2$ and a second wavelength region $k_2-\Delta k/2$ to $k_2+\Delta k/2$, where $k_2-k_1>\Delta k$. The interferometer signal will look qualitatively as shown in FIG. 8B. The real portion of the Fourier transform of the interferometer signal is shown in FIG. 8C, and includes three components, a DC component at x=0 and two components due to the interference, at x=$\pm\Delta x$. However, in the case of two wavelength regions, the amplitude of x=$\Delta x$ component is proportional to:

$$\text{Sinc}(\Delta k(\Delta x-x))\{1+\cos[2(k_2-k_1)(\Delta x-x)]\}^{1/2}$$

The amplitude function is the product of the unnormalized sinc function, whose zero half-width is $\pi/\Delta k$, and a new cosine-dependent term $\{1+\cos[2(k_2-k_1)(\Delta x-x)]\}$. The cosine-dependent term has a zero half-width at the +x component equal to $\pi/2/(k_2-k_1)$.

Because the difference in centers of the scan regions, $k_2-k_1$, may be much larger than the scan range of either region, $\Delta k$, spatial resolution provided by the technique of using two separated wavelength scan regions is improved over using a single scan region.

For illustration purposes, and to simplify the mathematics, we have chosen the scan range of the first and second wavelength regions to be identical. Note that in certain embodiments of this invention the wavelength ranges in the first and second wavelength regions may be different, but the benefits of using two or more scan regions will also be realized. For example, consider a single scan region of 100 nm from 1520 to 1620 nm. The spatial resolution, in air, is 12.3 microns. By contrast, consider two wavelength scans over 50 nm, with the first wavelength scan centered at 1595 nm and the second wavelength scan centered at 1335 nm. The resolution in air is 2.05 microns, or a factor of 6 better than the single wavelength scan region. One of ordinary skill in the art will appreciate that the above example is exemplary in nature and not intended to limit the scope of the present invention. Likewise, while the present invention has been illustrated to improve the spatial resolution for OCT and OFDR systems, one of ordinary skill in the art will readily appreciate that aspects of the present invention could be used to improve spatial resolution in other applications of interferometry, such as measurement of thickness variations in optically transparent materials, or in the measurement of surface profiles. This technique could possibly enhance the resolution of light detection and ranging (LIDAR) measurements of wind speeds and/or distances to distant objects.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A swept electromagnetic radiation system, comprising:
   a semiconductor laser operable to generate electromagnetic radiation through a first range of wavelengths and a second range of wavelengths, wherein the first range of wavelengths and the second range of wavelengths are spectrally separated, wherein the semiconductor laser is directly electronically wavelength selectable to discretely move between the first range to the second range without continuously sweeping a region between the first range and the second range;
   an interferometer coupled to the semiconductor laser, wherein the interferometer includes a reference path and a sample path;
   a detector for receiving electromagnetic radiation returned from the reference path and the sample path, wherein the detector generates output signals corresponding to the received electromagnetic radiation; and
   a controller coupled to the detector and the semiconductor laser, wherein the controller selectively causes electromagnetic radiation to be generated in the first range and the second range and the controller processes the output signals to generate image signals.

2. The system of claim 1, wherein the first range of wavelengths and the second range of wavelengths are separated by at least 80-200 nanometers.

3. The system of claim 2, wherein the first range has a first center point wavelength and the second range has a second center point wavelength, wherein the second center point wavelength is greater than the first center point wavelength.

4. The system of claim 2, wherein the first range is different from the second range.

5. The system of claim 1, wherein the semiconductor laser is a sample grating distributed Bragg reflector (SG-DBR) laser.

6. The system of claim 1, wherein the detector samples the electromagnetic radiation at substantially equal intervals of optical frequency.

7. The system of claim 1, wherein spatial resolution of the image is determined by the inverse of the wavelength separation between a first and second wavelength region, as well as by the wavelength range of the first and second regions.

8. The system of claim 1, wherein a predetermined period of time elapses between a transition between the first range and the second range.

9. The system of claim 1 further including a wavelength-dependent splitter operatively coupled between the interferometer and the detector, such that electromagnetic radiation output from the interferometer in the first wavelength range is detected at a first detector and electromagnetic radiation output from the interferometer in the second wavelength range is detected at a second detector.

10. The system of claim 9, wherein the wavelength-dependent splitter is a wavelength-division multiplexing filter.

11. The system of claim 9, wherein the wavelength-dependent splitter is an arrayed waveguide grating multiplexer.

12. The system of claim 1, wherein electromagnetic radiation in the first wavelength range has an orthogonal state of polarization relative to the electromagnetic radiation in the second wavelength range.

13. The system of claim 12, further including a polarization-dependent splitter operatively coupled between the interferometer and the detector, wherein the detector includes a first detector for detecting electromagnetic radiation output from the interferometer in the first wavelength range and the detector includes a second detector for detecting electromagnetic radiation output from the interferometer in the second wavelength range, such that electromagnetic radiation output from the interferometer in the first wavelength range is detected at the first detector and electromagnetic radiation output from the interferometer in the second wavelength range is detected at the second detector.

14. The system of claim 13, wherein the polarization-dependent splitter is a polarization beam splitter.

15. The system of claim 1, wherein the first range has a first center point wavelength and the second range has a second center point wavelength, wherein the separation between the first center point wavelength and the second center point wavelength is determined to less than $10 \times 10^{-6}$ of the shorter wavelength.

16. The system of claim 1, wherein the first range has a first center point wavelength and the second range has a second center point wavelength, wherein the separation between the first center point wavelength and the second center point wavelength is determined to less than $1.0 \times 10^{-6}$ of the shorter wavelength.

17. A method for sweeping electromagnetic radiation over a first range of wavelengths and a second range of wavelengths to generate an image, the method comprising:
   generating electromagnetic radiation through a first range of wavelengths and a second range of wavelengths by a semiconductor laser, wherein the first range of wavelengths and the second range of wavelengths are spectrally separated and the electromagnetic radiation is output through either the first range or the second range at a given time, wherein the semiconductor laser is electronically controlled to discretely move between the first range and the second range without continuously sweeping a region between the first range and the second range;
   splitting the electromagnetic radiation through a reference path and a sample path;
   detecting electromagnetic radiation returned from the reference path and the sample path, wherein a detector generates output signals corresponding to the received electromagnetic radiation; and
   processing the output signals to generate an image.

18. The method of claim 17, wherein a predetermined time elapses prior to electronically tuning the semiconductor laser to discretely move between the first and the second range.

19. The method of claim 17, wherein the electromagnetic radiation from the reference path and the sample path passes through a wavelength-dependent splitter such that light from the first wavelength range is detected by a first detector, and light from the second wavelength range is detected on a second detector.

20. The method of 19, wherein the wavelength-dependent splitter is a wavelength division demultiplexing filter.

21. The method of 19, wherein the wavelength-dependent splitter is an arrayed waveguide grating demultiplexer.

22. The method of claim 17, wherein light in the first wavelength range has an orthogonal state of polarization relative to the light in the second wavelength range.

23. The method of claim 22, further including a polarization-dependent splitter operatively coupled between the interferometer and the detector, such that electromagnetic radiation output from the interferometer in the first wavelength range is detected at a first detector and electromagnetic radiation output from the interferometer in the second wavelength range is detected at a second detector.

24. The method of claim 23, wherein the polarization-dependent splitter is a polarization beam splitter.

25. The system of claim 17, wherein the first range has a first center point wavelength and the second range has a second center point wavelength, wherein the separation between the first center point wavelength and the second center point wavelength is determined to less than $10 \times 10^{-6}$ of the shorter wavelength.

26. The system of claim 17, wherein the first range has a first center point wavelength and the second range has a second center point wavelength, wherein the separation between the first center point wavelength and the second center point wavelength is determined to less than $1.0 \times 10^{-6}$ of the shorter wavelength.

\* \* \* \* \*